United States Patent
Dröge

[19]

[11] Patent Number: 6,086,511
[45] Date of Patent: Jul. 11, 2000

[54] MOTOR VEHICLE ECONOMIC OPERATING SYSTEM

[75] Inventor: Bernhard Dröge, Neuberg, Germany

[73] Assignee: Agentur Dröge GmbH, Neuberg, Germany

[21] Appl. No.: 09/171,702

[22] PCT Filed: Apr. 25, 1997

[86] PCT No.: PCT/EP97/02146

§ 371 Date: Jan. 12, 1999

§ 102(e) Date: Jan. 12, 1999

[87] PCT Pub. No.: WO97/40997

PCT Pub. Date: Nov. 6, 1997

[30] Foreign Application Priority Data

Apr. 25, 1996 [EP] European Pat. Off. ............ 196 16 620

[51] Int. Cl.[7] .................................................. F16H 59/34
[52] U.S. Cl. .......................... 477/121; 477/107; 477/111; 477/902; 701/123
[58] Field of Search .................................. 477/111, 107, 477/901, 902, 121; 701/123

[56] References Cited

U.S. PATENT DOCUMENTS

| | | | |
|---|---|---|---|
| 4,280,469 | 7/1981 | Ganoung | 477/107 X |
| 4,463,427 | 7/1984 | Bonnetain et al. | 701/123 |
| 4,716,872 | 1/1988 | Pol | 123/352 |
| 4,845,630 | 7/1989 | Stephens | 701/123 |
| 5,638,790 | 6/1997 | Minowa et al. | 477/111 X |
| 5,643,133 | 7/1997 | Minowa et al. | 477/107 |
| 5,673,138 | 9/1997 | Mikami et al. | 477/111 |
| 5,754,968 | 5/1998 | Hedstrom | 477/121 X |

*Primary Examiner*—Charles A Marmor
*Assistant Examiner*—Ha Ho
*Attorney, Agent, or Firm*—Koda & Androlia

[57] ABSTRACT

A device for the economical operation of motor vehicles having internal combustion engines and transmissions. For each gear speed of a transmission, it is possible to preset one of more threshold values, and when these values are exceeded a closed-loop control intervenes and prevents a further rise in the fuel consumption. By virtue of the fact that each gear speed is assigned at least one separate threshold, the driving behavior of the motor vehicle can be adapted to various traffic situations. If appropriate, it is possible to dispence even with setting a threshold for many gear speeds.

22 Claims, 5 Drawing Sheets

Acceleration-Time
Diagram

Velocity-Time
Diagram

Travel-Time
Diagram

MOTOR VEHICLE ECONOMIC OPERATING SYSTEM

DESCRIPTION

The invention relates to a device as claimed in the preamble of patent claim 1.

The motor vehicle industry has been making increasing efforts to reduce the fuel consumption of its vehicles for several years. For this purpose, the industry has set itself targets which have become known under the slogan "3 liter car" for example. A "3 liter car" is understood to be a car which does not consume more than 3 liters of fuel, petrol or diesel per 100 kilometers during the normal driving cycle.

A device for limiting the fuel consumption is already known, said device having an input component for the setpoint value of kilometer-specific fuel consumption, i.e. for example the setpoint value 7 liters per 100 kilometers can be input and stored in a memory (DE-A 27 19 209). A fuel flow throttle which is arranged in the fuel path and an air intake throttle which is arranged in the air intake path are set as a function of the setpoint value which has been set. The two throttles are consequently adjusted in such a way that the same fuel consumption per 100 kilometers is always obtained. A disadvantage with this inflexible presetting of the fuel consumption is that, for example, the 7 liters per 100 kilometers which has been set is consumed even if a lower fuel consumption would have been possible. The setpoint value which is set is thus simultaneously a minimum value and a maximum value.

It is also known to measure the instantaneous power which is output by batteries in electric motors, and compare it with a preset value (EP 0 610 682 A1). If this comparison reveals that the instantaneous power is lower than a preset maximum power, the motor is adjusted upward to the preset power. However, if the instantaneous power is higher than the preset maximum power, the motor is adjusted downward to the preset power. Therefore, adjustment is carried out here to a specific power value. For the rest, the conditions in electrometers are not comparable to the conditions in internal combustion engines insofar as electric motors do not require any gear speed shifting operations. Furthermore, the fuel consumption values are different in the individual gear speeds.

In a known device for apportioning the fuel/air mixture for an internal combustion engine for adjusting to a minimum specific fuel consumption value it is known to use the engine speed and the fuel apportioning signal as actual information (DE-A 34 03 394). The setpoint values can be preset here as a function of the selected gear speed of the transmission which is connected to the internal combustion engine. The adjustment to minimum fuel consumption does not, however, bring about any limitation to a specific instantaneous fuel consumption value here, but instead it can exceed any preset value if the lowest possible fuel consumption occurs only at the power level which is output. It is not intended here that there should be power limitation which can occur during a limitation of the apportionment of the fuel.

In addition, a consumption measuring and closed-loop control device is known preferably for diesel engines, said device having at least a flow meter and a display device (DE-A 33 35 650). In this device, the fuel consumption is measured and the average consumption and/or the overall consumption per time unit is displayed in conjunction with a vehicle-mounted computer, and when the values deviate from preset values the consumption of the engine is adjusted. By virtue of the fact that the open-loop and closed-loop control device is additionally influenced by the engine speed (cf. also DE-A 34 00 513), the closed-loop control can be performed by means of influencing variables, it being impossible to achieve this control solely by measuring the flow. However, the engine speed is not a suitable criterion because, without additional information, it does not provide any indication of the gear which is currently selected.

In another known control device for an internal combustion engine, both the fuel quantity and the acceleration or deceleration can be measured (DE-A 39 34 498). However, gradients cannot be determined by means of these measurements.

Flow sensors are frequently used to determine or measure the instantaneous fuel consumption. However, it is also known to obtain the consumption data from a stored characteristic diagram, the consumption data being corrected as a function of the acceleration-dependent and/or temperature-dependent values (DE-A 32 45 546).

Furthermore, devices which, when required, eliminate the effect of economy circuits or devices ("Kick-down", cf. DE-A 38 35 512) are known.

Finally, a method for operating an internal combustion engine which has a fuel apportionment device is also known, in which case a curve which connects the points of maximum permissible fuel consumption for various engine speeds (DE-A 29 26 024) is determined in the power/speed diagram of the internal combustion engine. However, a measuring arrangement which directly measures the instantaneous consumption of fuel is not provided here. Instead, inferences regarding the instantaneous consumption are made by means of other values. Furthermore, a device for setting a threshold value for the instantaneous fuel consumption is provided. In addition, although a consumption-dependent change-over into another gear speed takes place, at least one threshold value of the instantaneous fuel consumption is not assigned to each gear speed.

The invention is therefore based on the object of automatically adjusting, for example to a preset maximum value, the instantaneous fuel consumption in motor vehicles with an internal combustion engine.

This object is achieved in accordance with the features of patent claim 1.

The invention thus relates to a device for the economical operation of motor vehicles having internal combustion engines and manual or automatic transmissions. For each gear speed of a transmission it is possible to preset one or more threshold values, and when these values are exceeded a closed-loop control intervenes and prevents a further rise in the fuel consumption. By virtue of the fact that each gear speed is assigned at least one separate threshold, the driving behavior of the motor vehicle can be adapted to various traffic situations. If appropriate, it is possible to dispense even with setting a threshold for many gear speeds.

The advantage which is achieved with the invention consists in particular in a considerable reduction in the fuel consumption. By virtue of the fact that a preset, instantaneous fuel consumption value is automatically prevented from being exceeded, the driver of a motor vehicle is relieved of the task of orienting his driving behavior according to the instantaneous fuel consumption, a task which is virtually impossible to carry out. Experience has shown that it is also difficult, over the long term, to activate an accelerator pedal in such a way that a specific threshold value for instantaneous fuel consumption is not exceeded. A further advantage of the invention also arises from the fact that the automatic closed loop control engages only under specific conditions. Thus, for example, the consumption of a specific type of motor vehicle may be uncontrolled in the first gear speed up to a velocity of 40 km/h, while the control is initiated in the second gear between the limiting velocities of 40 km/h and 60 km/h. The control for the third gear speed could engage between the limiting velocities of 60 km/h and 80 km/h, whereas in the fourth and fifth gear speeds the control is initiated in a general fashion. Other limiting velocities are of course possible, and even necessary because of the different types of vehicle.

Exemplary embodiments of the invention are illustrated in the drawing and described in more detail below. In the drawing.

Figure 1A:
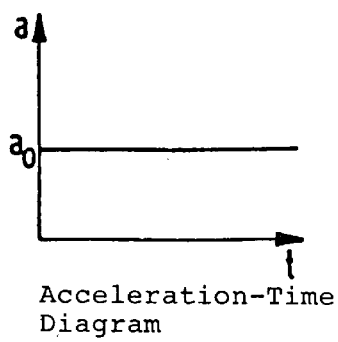
FIG. 1a shows an acceleration/time diagram.
Figure 1B:
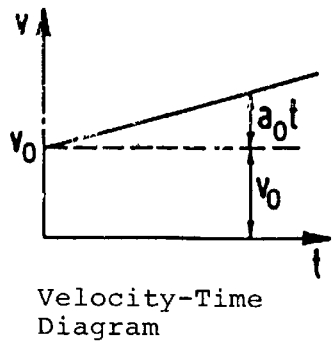
FIG. 1b shows a velocity/time diagram.
Figure 1C:
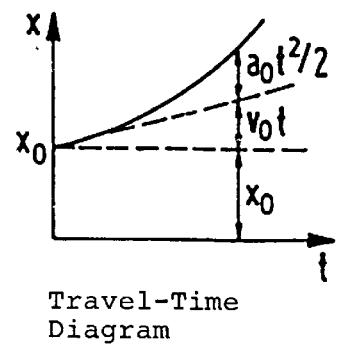
FIG. 1c shows a travel/time diagram.

FIGS. 1a to 1c are different diagrams which show the known relationship between travel, velocity and acceleration. FIG. 1a illustrates a movement with constant acceleration, i.e. a motor vehicle is accelerated uniformly. In the case of uniform acceleration, the velocity increases linearly, as is shown by FIG. 1b. $v=v_0+a_0t$ then applies. In this case, the travel increases non-linearly, i.e. in a parabolic form according to the equation $x=x_0+v_0t+a_0t^2/2$. If the acceleration $a_0=0$, the velocity $v=v_0$, i.e. it is constant, and the distance traveled is $x=v_0t$. This last-mentioned constellation applies, for example, to a journey at constant velocity on a freeway.

During an acceleration process such as is illustrated by the diagrams in FIGS. 1a to 1c, the fuel consumption increases non-linearly, for example as in FIG. 1c. The increase in fuel consumption is significantly faster if the acceleration is not constant, as is shown in FIG. 1a but instead is even increasing, for example as in FIG. 1b. The object of the invention is to prevent such rapid increases in fuel consumption.

Figure 2:
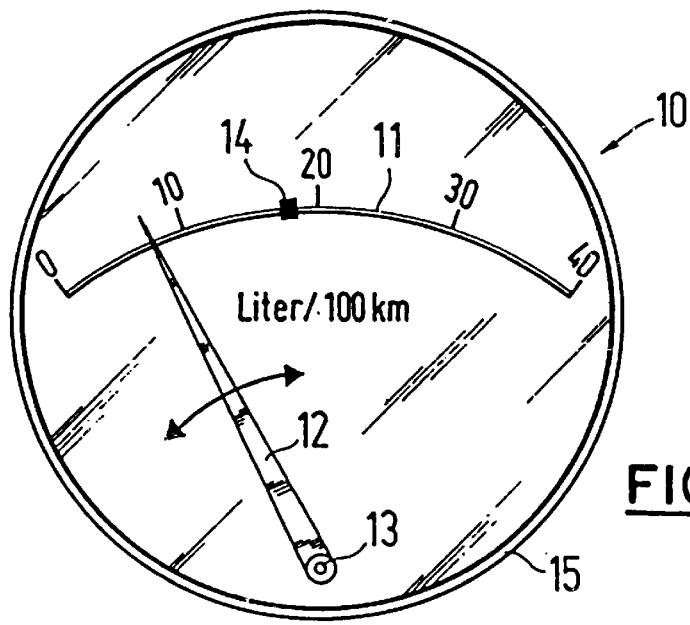
FIG. 2 shows a measuring device for displaying the instantaneous consumption of fuel.

FIG. 2 is an external view of a measuring device 10 which shows the instantaneous fuel consumption. This measuring device has a scale 11 on which the values 0, 10, 20, 30 and 40, which show the fuel consumption in liters per 100 km, are plotted.

A pointer 12, which can rotate about a point 13, points directly to a consumption of approximately 7 liters/100 kilometers, i.e. if the current driving cycle is maintained, the total consumption of fuel after a distance of 100 km has been traveled is equal to 7 liters. If strong acceleration takes place in the state shown in FIG. 2, the pointer is rapidly deflected to the right and can easily reach the 40 liter mark.

In order to prevent the associated high consumption of energy, it is possible to define a threshold which is not to be exceeded. For this purpose, it is, for example, possible to configure the scale 11 as a rail on which a rider 14 can be mounted. This rider 14 can be attached to the rail at any desired point and marks the respective threshold.

In the constellation illustrated in FIG. 2, the rider is at approximately 18 liters/100 km, i.e. this consumption is not to be exceeded. But just one rider is illustrated in FIG. 2. However, of course at least one separate rider may be provided for each gear speed.

In order to ensure a threshold value is exceeded, the pointer 12 can have an infrared transmitter and an infrared receiver on its underside, said transmitter or receiver interacting with the rider 14.

Figure 3:
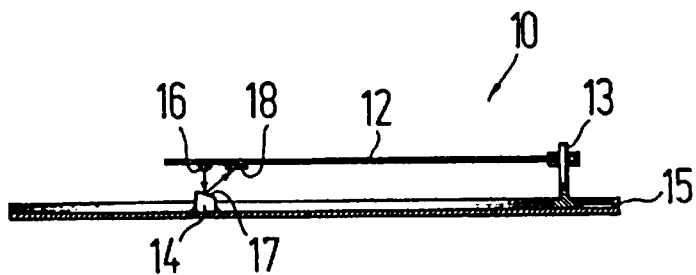
FIG. 3 shows a side view of the pointer of the measuring device according to FIG. 2.

This is illustrated schematically in FIG. 3. The pointer 12 can be moved by means of the rider 14 within the edge 15 of the measuring device 10. If the pointer 12 has reached the rider 14, the infrared light of a light-emitting diode 16 is projected on to a mirrored surface 17 of the rider 14. Since this surface 17 is somewhat inclined, the reflected light is transmitted to the light receiver 18 which is arranged next to the diode 16. This reflected light signal which is detected by the light receiver 18 triggers a measurement of the pointer position, i.e. it is determined which position the pointer 12 is in when the reflected light signal is received by the receiver 18. Such a sensing of position is possible with means which are known per se, for example with the use of an incremental motor to drive the pointer.

Here, the relative angular position of the shaft of the motor is sensed, for example using optical means. The position of the pointer 12 can also be determined indirectly by means of the current which flows through the electric drive of the pointer 12.

However, more significant than the sensing of the position of the pointer 12 is that when a reflected light signal is received, the supply of fuel is throttled or some other measure which reduces the fuel consumption is initiated. If in each case one rider is used per gear speed, the respective riders can be distinguished by means of a corresponding code. This code can be achieved, for example, by means of a different shaping of the riders 14 or the sensors 14, 18.

Figure 4:
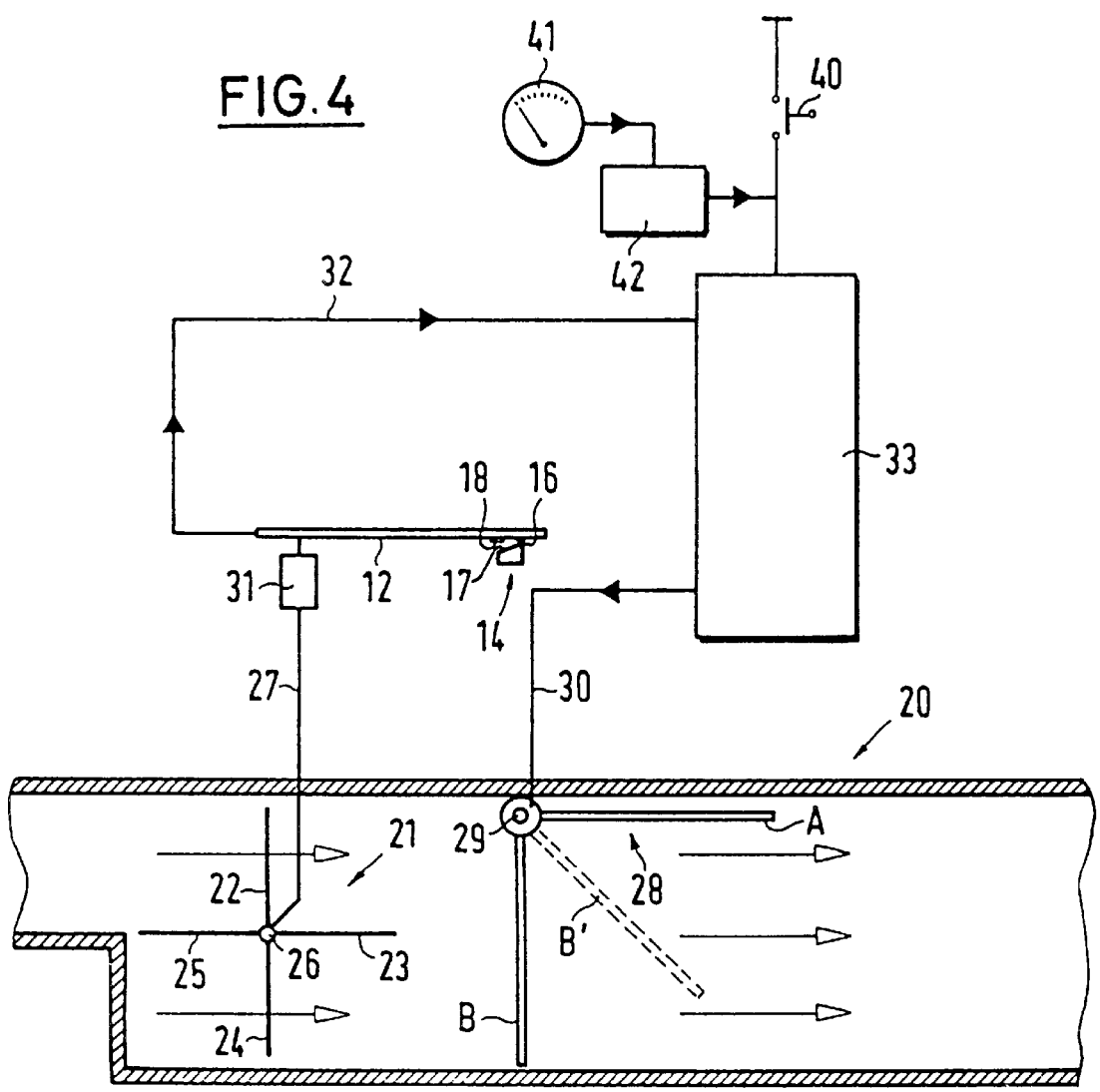
FIG. 4 shows a means of sensing and controlling the flow.

FIG. 4 is a schematic illustration of how a threshold value control according to the invention can be carried out in principle. For the sake of simplicity it has also been assumed that there is just one rider here too. 20 designates part of a petrol feed line which is arranged between a petrol tank (not illustrated) and a spark ignition engine (not illustrated). In this petrol feeder line 20 there is an impeller wheel 21 which has vanes 22 to 25 and which rotates in the clockwise direction when petrol is flowing through, for example. The rotational speed of this impeller wheel is sensed, for example, by a small generator 26 whose rotor is connected to the shaft of the impeller wheel.

The electrical signal which is generated by the generator 26 is proportional to the flow rate of the petrol and is fed, inter alia, to a drive 31 of the pointer 12 via an electrical line 27. In the feed line 20 there is also a throttle valve 28 which can be moved from a position A into a position B by means of a drive 29. All the intermediate positions between A and B are possible here. The drive 29 receives its instructions via a line 30.

If the pointer 12 with its infrared diode 16 moves over the rider 14, the light signal received by the receiver 18 is converted into an electrical signal which serves to control the valve 28. This signal is fed via a line 32 to a control unit 33 which itself actuates the drive 31 of the valve via the line 30. In response, the valve is moved suddenly, for example with a very high instantaneous consumption, from position A into position B so that the entire supply of petrol is shut off. The impeller wheel 21 then rotates more slowly or comes to a standstill entirely, as a result of which the pointer 12 is moved into its home position—position 0 in FIG. 2—owing to the control signal on the line 27.

However, in practice an abrupt shutting off of the fuel supply is less recommended because, as a result, the motor vehicle suddenly moves more slowly. It is more pleasant if the control engages gently and keeps the pointer 12 in a position just before the rider 14.

In order to achieve this, a circuit, which, when a signal occurs on the line 32, does not move the valve 28 into position B but rather into an intermediate position B' (which is represented by broken lines for example), is provided in the control device 33. The transition from position A to position B does not take place abruptly here, but rather gradually so that the flow of petrol also decreases only gradually. As a result of this gradual throttling of the petrol supply, the impeller wheel 21 also rotates more and more slowly and thus slowly moves the pointer 12 back again. If this pointer 12 passes over the rider repeatedly—this time in the other direction—the signal which is produced in the process can be utilized to move the valve 28 into, or hold it in, such a position that the pointer 12 comes to rest just before the rider 14. Of course, instead of the flow of fuel, the difference between the flow of fuel and the fuel discharge or, in the case of engines with fuel injection, the injected quantity of fuel may be used as the criterion.

Figure 5A:
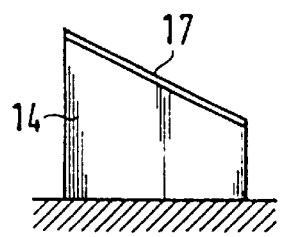
FIG. 5a shows a sensor rider from a first side.
Figure 5B:
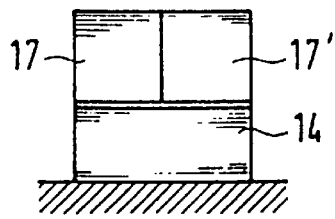
FIG. 5b shows the sensor rider in FIG. 5a from a second side, which is rotated through 90 degrees in comparison with the first side.

FIGS. 5*a* and 5*b* show a refinement of the rider 14 with which it is possible to determine whether the pointer 12 passes over the rider 14 from the left or from the right. The surface of the rider 14 is divided here into two partial mirrors 17, 17' which are slightly inclined with respect to one another. If the light is incident on the partial mirror 17', the light beam is deflected differently than if it is incident on the partial mirror 17. By using two different receivers 18 arranged one next to the other, it is thus possible to determine from which side the pointer 12 passes over the rider.

If the automatic flow control is to be eliminated, the driver can activate a kick-down 40 or other elements. This activation causes the valve 28 to be moved back into its position A. The need to deactivate the flow control may arise, for example, during critical overtaking maneuvers where rapid acceleration becomes necessary. If the instantaneous value then drops again to normal consumption or to the consumption value which has been set as the threshold value, the flow control can be automatically activated again.

Since it makes little sense to activate the flow control as soon as the vehicle is started up, it is possible, in one development of the invention, to use the flow control only above a certain travel velocity. This is indicated in FIG. 4 by virtue of the fact that the travel velocity which is shown by a speedometer 41 is converted into an electrical signal and is transmitted to a threshold value detector 42. The control unit 33 is not activated until a preset velocity threshold is exceeded.

The general use of the flow control independently of the respective environmental conditions can lead to inappropriate results. For this reason, in one development of the invention, a distinction is made between a journey on level ground and a journey on a gradient.

An uphill journey always requires higher fuel consumption than a journey on level ground with the result that the fuel flow has to be adapted to the changed conditions.

If, for example, the position B' of the valve 28 is appropriate for a journey on level ground, this position would signify excessive throttling when traveling uphill. For this reason, the valve should be closed to a somewhat lesser degree.

In order to be able to carry out corresponding adaptive control, the respective gradient which is currently being traveled on is determined.

Figure 6A:
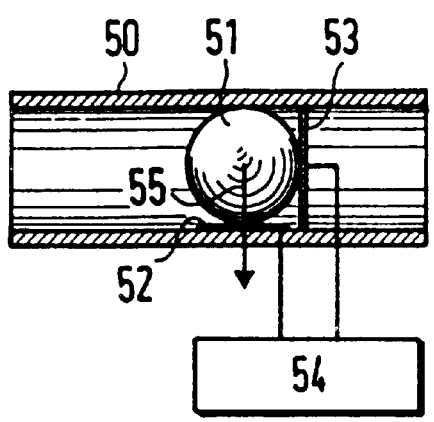
FIG. 6a shows a gradient measuring device in a level position.
Figure 6B:
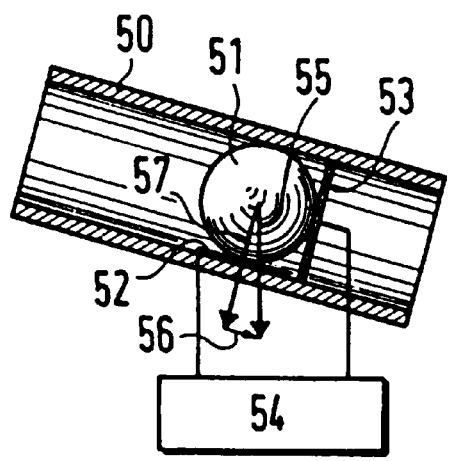
FIG. 6b shows a gradient measuring device in an oblique position.

FIGS. 6*a* and 6*b* illustrate an incline measuring device with which it is possible to measure the gradients which a motor vehicle is traveling on when traveling in mountains, for example.

In a tube 50 there is a sphere 51 which bears against a bottom pressure sensor 52 and a lateral pressure sensor 53. The pressures which are measured by the pressure sensors 52, 53 are fed to an evaluation circuit 54. An arrow or vector 55 symbolizes the weight of the sphere 51.

During a journey on level ground, the tube 50 assumes the horizontal position shown in FIG. 6*a*, while it assumes the position shown in FIG. 6*b* when traveling on a gradient.

In an ideal case, the pressure sensor 52 senses the entire weight of the sphere 51 in the position in FIG. 6*a*; whereas the lateral sensor 53 emits virtually a zero signal because the sphere 55 is not pressing on it.

However, in the position according to FIG. 6*b*, the sensor 53 senses a pressure which is caused by the horizontal weight component 56 of the sphere. The pressure sensed by the sensor 52 is, in contrast, smaller because the weight component 57 is smaller than the overall weight 55 of the sphere 51.

The respective gradient can be determined by means of the evaluation device 54 by virtue of the different pressure conditions.

The component sensed by the sensor 52 is of particular significance in this process because, in contrast to the component which presses on the sensor 53, it does not depend on the acceleration of the motor vehicle. This is important because the acceleration causes a force to be generated which is superimposed on the force due to weight 56.

As a result of suitable calculation measures it is possible to determine not only the gradient but also the acceleration with the arrangement according to FIGS. 6*a*, 6*b* because the force acting on the sensor 53 is composed of a weight component and an acceleration component. Since the gradient can be determined solely on the basis of the component sensed by the sensor 52, the acceleration can be calculated by evaluating the pressure determined with the sensor 53.

Of course, in practice it is necessary to take particular measures in order to eliminate the influence of unevenness of the ground and the like on the accelerations acting on the sphere 51. Integration methods or statistical methods, which are known per se, can be used for this.

In a further refinement of the invention, further data which can be, or have to be, taken into account during the maximum value control are fed to the control device. These data include, for example, specific data of the vehicle and/or of the respective engine. Thus, it may, for example, be important to take into account the respective torque or the engine speed in the control of the consumption so that an engine is not stalled.

The controller according to the invention can also interact with an automatic transmission, if one is present, so that the transmission can be shifted automatically into the respective most suitable gear speeds.

Figure 7:
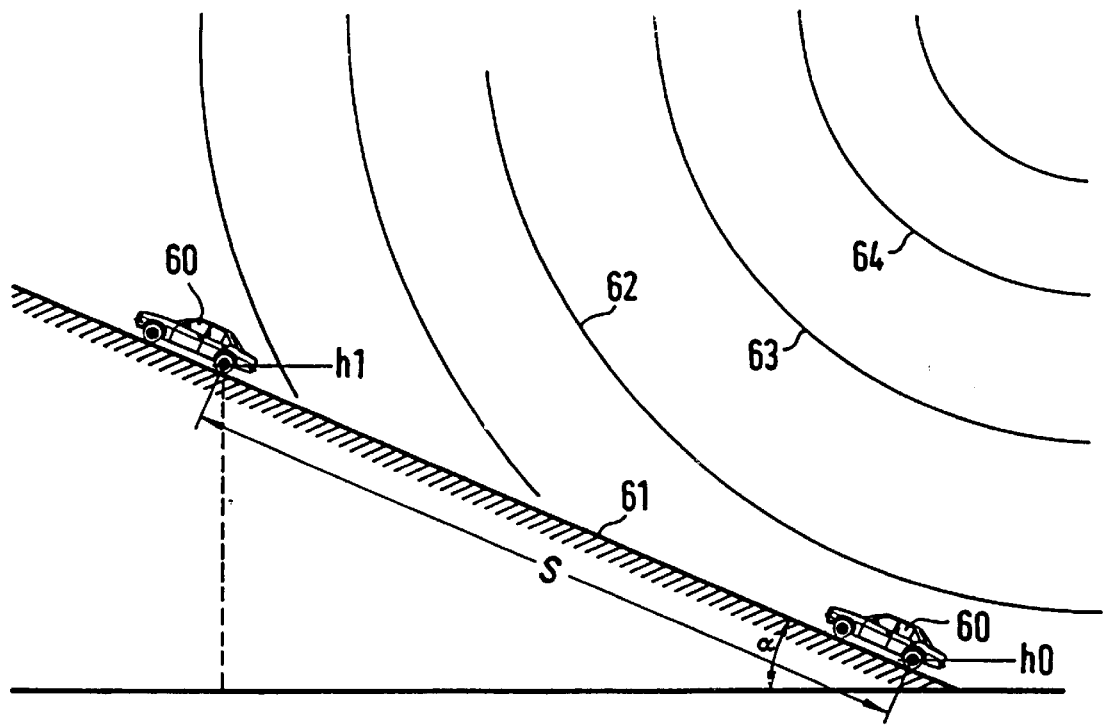
FIG. 7 shows a gradient measurement using satellite radio.

FIG. 7 illustrates another possible way of determining gradients. A motor vehicle 60 is located here at the time $t_0$ at an altitude of $h_0$ and subsequently travels up a steep incline 61 in order to reach the altitude $h_1$ at the time $t_1$.

The information on the altitudes $h_0$ and $h_1$ is determined here by a vehicle-mounted computer which evaluates satellite data, such as is customary in satellite navigation systems (cf. DE-A 34 26 851, DE-A 41 23 097, for example). The radio signals of the satellites are designated by 62 to 64 in FIG. 7. The distance s may be determined—assuming a constant velocity—by means of the formula $s=v\ t=v\ (t_2-t_1)$. If the altitude $h_1-h_0$ is calculated by the computer, the gradient α can be determined by means of the relationship $(h_1-h_0)/s=\sin\alpha$. Using methods known per se it is possible to determine the gradient even if the velocity is not constant.

If it is assumed that a specific fuel consumption value ("normal consumption") is assigned to a specific combination of steady gas pedal position and selected gear speed or of a specific combination of engine speed and velocity on level ground or if stable conditions (steady accelerator pedal, constant velocity and constant consumption) have been detected over a time period and this fuel consumption changes abruptly, it is possible to conclude from this that there is a negative gradient, a positive gradient, a change in the frictional resistance or a change in the wind conditions. This may make corresponding changes or adaptation of the maximum consumption control appropriate.

Figure 8:
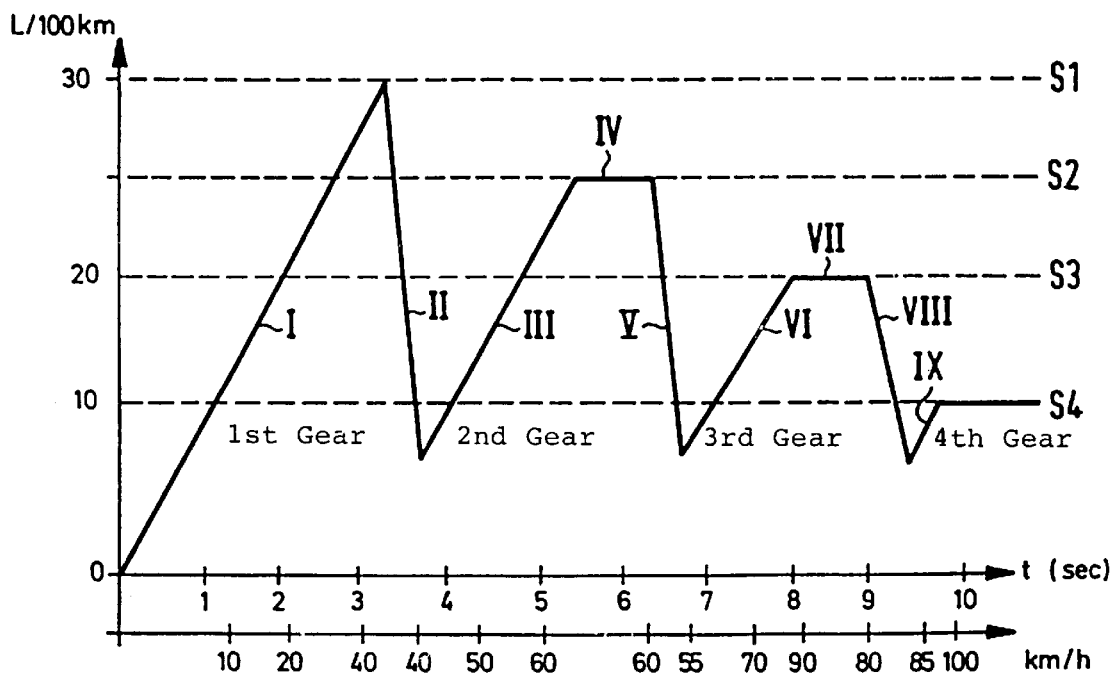
FIG. 8 shows a graphic representation of a possible instantaneous consumption control.

FIG. 8 shows a graphic illustration of a possible control according to the invention. Here, the fuel flow is plotted against time. The ordinate shows the instantaneous fuel consumption in liters/100 km and in ml/sec, while the abscissa shows the time t and/or the velocity $\dot{v}$.

The flow of a mass is often given in mass per time unit. The term then used is mass flow $\dot{m}$. If the mass is not compressible, or virtually incompressible, the mass is proportional to the volume and the term then used is volume flow $\dot{v}$.

Fluids, and thus also petrol, are largely incompressible so that volume flow can be assumed. The unit liter/100 km which is used in customary instantaneous consumption displays is selected because the fuel consumption of motor vehicles is normally related to 100 km. The reference to 100 km is for historical reasons and in fact assumes a constant driving cycle, for example a constant velocity on level ground. However, it is obvious that the consumption of fuel is significantly higher if the 100 km is traveled at a constant velocity of 150 km/h than if it is traveled at a constant velocity of 80 km/h because the air resistance rises out of proportion as the velocity increases. For this reason, a rising curve is obtained if the fuel consumption per 100 km is plotted against the velocity.

The instantaneous consumption of a motor vehicle depends on the velocity, but not exclusively. Frictional resistances and gradients are also influencing factors.

The volume flow $dV/dt=\dot{v}$ is the variable which characterizes the actual consumption. If this instantaneous consumption is extrapolated to 100 km, the velocity must be known. If, for example, a volume flow of 2 ml/sec is measured at a velocity of 90 km/h=25 m/sec, it follows that the motor vehicle consumes 2 ml fuel over 25 m. Given a constant fuel consumption this would mean that the motor vehicle would consume 4000 times (25 m×4000=100 km) over 100 km, that is to say 8 liters (2 ml×4000=8 liters).

If 2 ml/sec volume flow is determined for a velocity of 110 km/h=30.55 m/sec, a consumption of 6.54 liters per 100 kilometers is obtained. The volume flow $\dot{v}$ measured in ml/sec and the instantaneous consumption of fuel measured in liters/100 km are thus proportional to one another.

However, the instantaneous consumption of fuel is only a limited indication of whether a driving cycle is economical because a vehicle may be driven at a velocity of, for example, 50 km either in the second or the third gear speed, may maintain such a velocity constantly or only "pass through it" during excessive acceleration, in which case however, the fuel consumption is different.

Which gear is currently selected can be sensed, for example, by means of sensors which detect the spatial position of a transmission shifter. However, it is also possible to determine the respectively selected gear speed by means of the engine speed and the velocity.

If the driver of the vehicle selects the first gear speed and accelerates the vehicle, the fuel consumption rises rapidly, for example within three seconds, to 30 liter/100 km, as is shown by the portion of curve I in FIG. 8. Strictly speaking, the fuel consumption in FIG. 8 must be illustrated as originating from the infinite because the consumption is infinite at V=0. However, the schematic illustration of FIG. 8 is intended to indicate that the consumption in the case of increasing acceleration also increases in the first gear speed. If a driver de-clutches and selects the second gear speed, the consumption initially drops (portion of curve II) before rising again (proportion of curve III). If a maximum consumption of, for example, 25 liters/100 km is defined for the second gear speed, the instantaneous consumption cannot exceed the threshold S2. The instantaneous consumption therefore remains constant (portion of curve IV). If the engine is shifted into the third gear speed, the consumption initially drops away again during de-clutching (portion of curve v) and subsequently rises again (portion of curve VI). The upper consumption value defined for the third gear speed S3 is 18 liter/100 km so that the threshold S3 is not exceeded (portion of curve VII). If the transmission is shifted to the fourth gear speed, the consumption curve (portion of curve VIII) drops away again and subsequently rises again (proportion of curve IX). The threshold value for the fourth gear speed is then S4=12 liter/100 km so that even if the accelerator pedal is depressed further, consumption higher than 12 liter/100 km is not possible.

Of course, the illustration in FIG. 8 is a rough simplification because, inter alia, a linear rise in the fuel consumption has been assumed. Furthermore, only one threshold value per gear speed is illustrated. However, it is possible to provide a plurality of threshold values per gear speed, the respective threshold values being assigned to specific velocities for example.

The velocity of the motor vehicle increases during the starting up process. However, it is not directly proportional to time but rather depends, for example, on the time and the instantaneous fuel consumption, such as is shown by the abscissa underneath the t axis in FIG. 8. The respective velocities can, as already mentioned, also be used as the control criterion and the instantaneous consumption, for example, can be controlled only if a specific threshold value is reached at a specific velocity.

The fact that the threshold value which has been set for a gear speed is prevented from being exceeded only above a specific velocity ensures that the motor vehicle receives sufficient fuel supply when starting up and accelerating.

As is clear from FIG. 8, no control at all is carried out up to 40 km/h in the first gear speed. Control is carried out above 60 km/h in the second gear speed, while control is carried out above 70 km/h in the third gear speed and above 105 km/h in the fourth gear speed, since, in this example, the first gear speed is uncontrolled up to 40 km/h, and up to the respectively mentioned velocities the actual consumption in the second, third and fourth gear speeds is lower than the maximum permitted consumption.

The respectively set threshold value can also be adapted to various influencing variables, for example to the positive or negative gradient of a roadway, to the frictional resistance between the roadway and tires, to the operating temperature of the engine, to the spatial position of the accelerator pedal, to the engine speed, to the wind pressure or to the instantaneous velocity.

In FIGS. 9a to 9d, conditions under which control is carried out are illustrated once more as AND conditions. Only if three conditions are fulfilled in each case in the illustrated examples is control carried out in a predefined fashion.

Figure 9A:
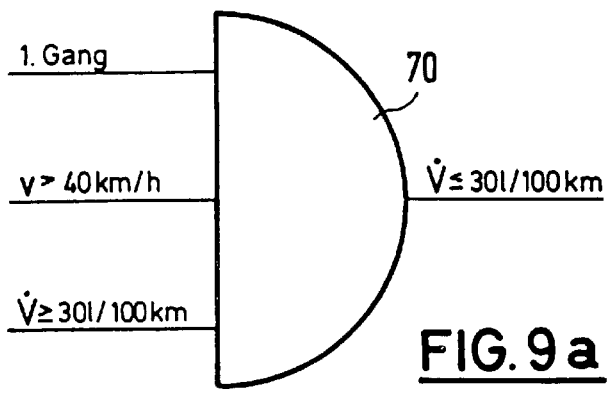
FIGS. 9a–9d show four AND conditions for threshold value control.
Figure 9B:
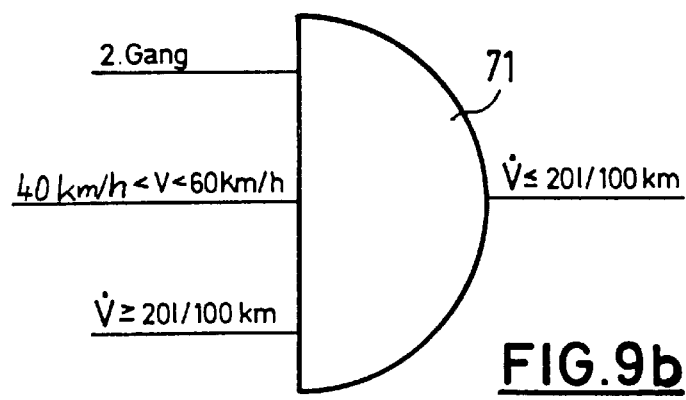
Figure 9C:
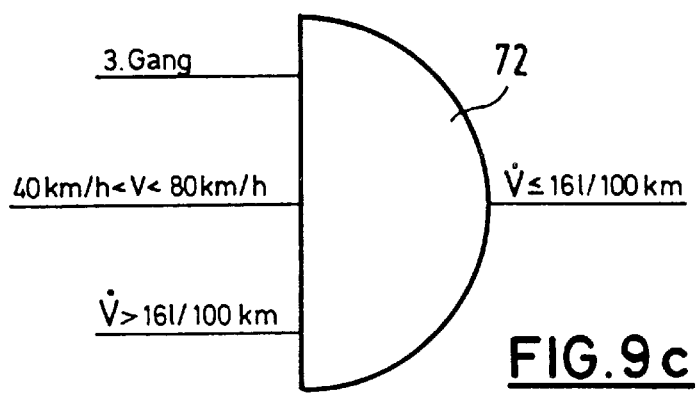
Figure 9D:
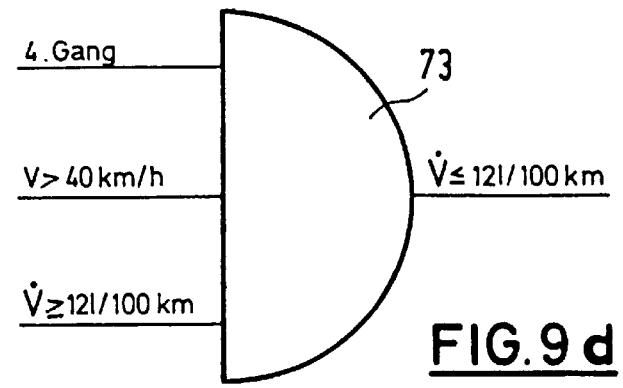

For example, according to FIG. 9a, the consumption is adjusted to V=30 l/100 km only if the following conditions are fulfilled at the AND gate 70: the 1st gear speed has been selected, the velocity is higher than 40 km/h and the fuel consumption has reached 30 l/100 km. The fact that the output signal of the AND gate in FIG. 9a is identical to an input signal merely indicates that adjustment to the value obtained at the input should take place. Of course, it would also be possible to adjust in the case of an input signal of 28 l/100 km to v=30 l/100 km, or in the case of an input signal of v=30 l/100 km to v=32 l/100 km or v=28 l/100 km. In these cases, a distinction would be made between the input and output signals. Of course, the 1st gear speed can be assigned to a plurality of velocities and to a plurality of threshold values.

In order to implement the invention, preferably no fixed mechanical connection between accelerator pedal and fuel throttle is provided, but instead the accelerator pedal merely has the function of an adjustable potentiometer which activates an actuator element which is itself activated at a specific threshold value of the fuel consumption and activates an actuator motor which moves a fuel throttle. It is also possible to activate not only a fuel throttle but also an air supply throttle.

I claim:

1. A device for the economical operation of motor vehicles having an internal combustion engine and a manual or automatic transmission, having
   1.1 a measuring device (22 to 25) for determining the instantaneous value of the fuel which is fed to the engine or consumed by the engine,
   1.2 a device (14) for setting a threshold value of said instantaneous value,
   1.3 a closed-loop control device (33) which prevents the threshold value which has been set from being exceeded,
   wherein one or more separate threshold values (S1 to S4) can be assigned to each gear speed of the transmission.

2. The device as claimed in claim 1, wherein the respectively selected gear speed is sensed by sensors which detect the position of a transmission shifter.

3. The device as claimed in claim 1, wherein the respectively selected gear speed is determined by means of the combination of engine speed and vehicle velocity.

4. The device as claimed in claim 1, wherein a first threshold value is assigned to a first velocity for a specific, selected gear speed while a second threshold value is assigned to a second velocity for the specific, selected gear speed.

5. The device as claimed in claim 1, wherein the upward transgression of the threshold value which has been set for a gear speed is determined only above a specific velocity.

6. The device as claimed in claim 1, wherein the threshold value is adaptively linked to influencing variables.

7. The device as claimed in claim 6, wherein the influencing variable is the negative or positive gradient of a roadway.

8. The device as claimed in claim 6, wherein the influencing variable is the frictional resistance between roadway and tire.

9. The device as claimed in claim 6, wherein the influencing variable is the operating temperature of the engine.

10. The device as claimed in claim 6, wherein the influencing variable is the position of an accelerator pedal.

11. The device as claimed in claim 6, wherein the influencing variable is the engine speed.

12. The device as claimed in claim 6, wherein the influencing variable is the instantaneous vehicle velocity.

13. The device as claimed in claim 6, wherein the influencing variable is the wind pressure.

14. The device as claimed in claims 7, 8 or 13, wherein changes in the frictional resistance or the wind conditions, the deviation in the fuel consumption and/or the accelerator position and/or the velocity and/or the engine speed and/or the gear speed serve as indicators for traveling uphill or downhill.

15. The device as claimed in claim 1, wherein an apparatus which can be operated by the driver of the vehicle and with which the device can be disabled.

16. The device as claimed in claim 1, wherein the threshold value can be set by the driver of the vehicle.

17. The device as claimed in claim 1, wherein the closed-loop control of the fuel consumption is effected in a damped fashion.

18. The device as claimed in claim 1, wherein the closed-loop control is switched off if the instantaneous consumption of fuel rises in an extreme fashion.

19. The device as claimed in claim 7, wherein a sphere (51) which bears against two force-measuring devices or pressure-measuring devices (52, 53) is provided as gradient measuring device.

20. The device as claimed in claim 19, wherein the sphere (51) is arranged in a pipe (50) which has a first pressure-measuring device (52) on the inner surface of said pipe and a second pressure-measuring device (53) perpendicular thereto.

21. The device as claimed in claim 7, wherein an altitude difference is determined from the data transmitted by satellites and the gradient is determined from said altitude difference.

22. The device as claimed in claim 16, wherein a pointer measuring device (10) is provided which has a rail (11) on which a rider (14) is mounted, and a pointer (12) which can be moved by the rider (14) which has a sensor (16, 18) provided for sensing the position of the rider (14).

* * * * *

UNITED STATES PATENT AND TRADEMARK OFFICE
CERTIFICATE OF CORRECTION

PATENT NO. : 6,086,511
DATED : July 11, 2000
INVENTOR(S) : Bernhard Dröge

It is certified that error appears in the above-indentified patent and that said Letters Patent is hereby corrected as shown below:

Title page,
Item [30] Foreign Application Priority Data:

Change "Apr. 25, 1996 [EP] European Pat. Off. ... 196 16 620,"
to --Apr. 25, 1996 [DE] German Pat. Off. ... 196 16 620.9--

Signed and Sealed this

Twenty-second Day of May, 2001

*Attest:*

NICHOLAS P. GODICI

*Attesting Officer*     *Acting Director of the United States Patent and Trademark Office*